C. J. FAY.
Horse Hay Rake.
No. 30,132.
2 Sheets—Sheet 1.
Patented Sept. 25, 1860.
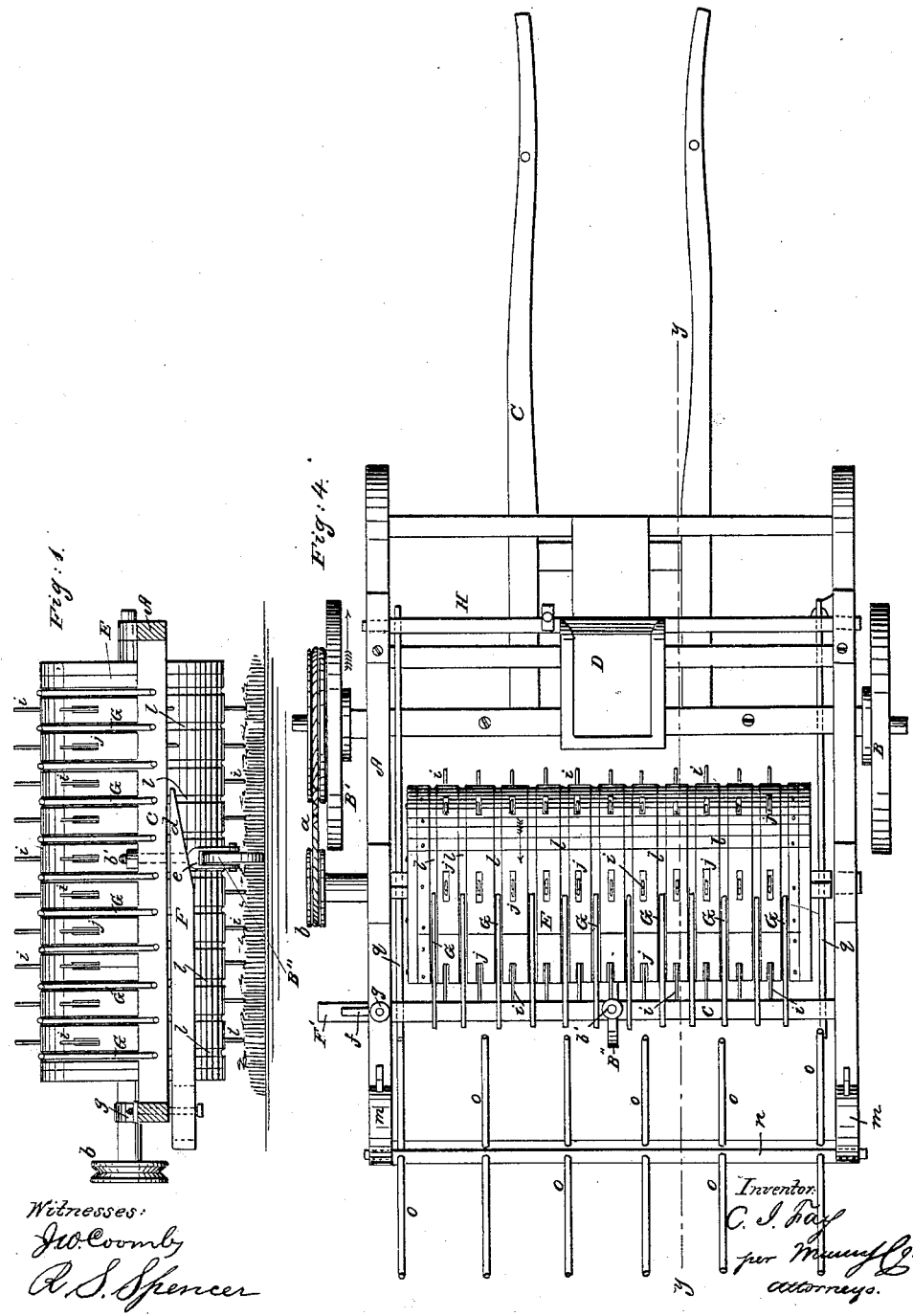

C. J. FAY,
Horse Hay Rake.
No. 30,132.
2 Sheets—Sheet 2.
Patented Sept. 25, 1860.
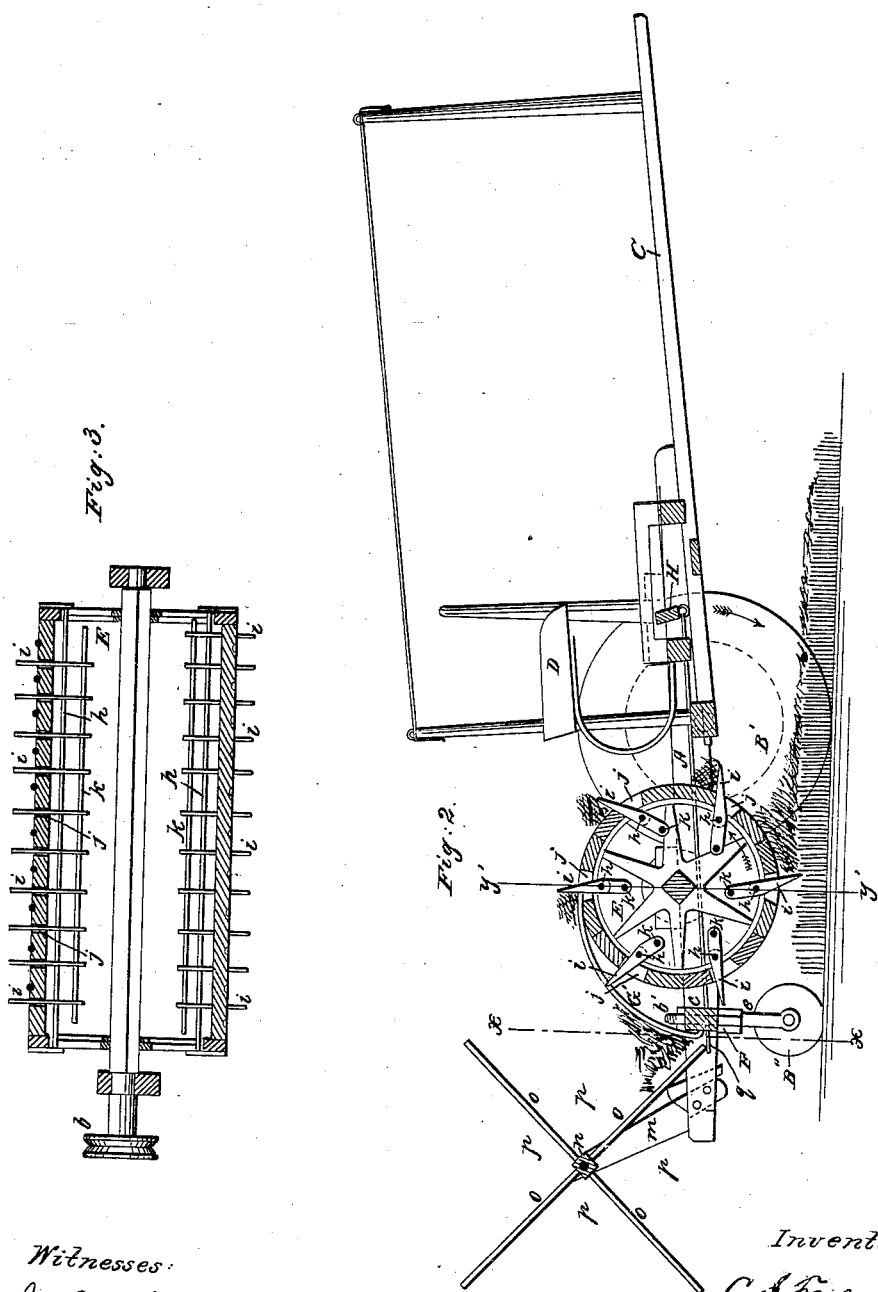

UNITED STATES PATENT OFFICE.

CYRUS J. FAY, OF HAMMONTON, NEW JERSEY.

IMPROVEMENT IN HAY-RAKES.

Specification forming part of Letters Patent No. 30,132, dated September 25, 1860.

*To all whom it may concern:*

Be it known that I, CYRUS J. FAY, of Hammonton, in the county of Atlantic and State of New Jersey, have invented a new and Improved Hay-Rake to be Operated or Drawn by Horse-Power; and I do hereby declare that the following is a full, clear, and exact description of the same, reference being had to the annexed drawings, making a part of this specification, in which—

Figure 1 is a vertical section of my invention, taken in the line $xx$, Fig. 2; Fig. 2, a side sectional view of my invention, taken in the line $yy$, Fig. 4; Fig. 3, a vertical section of the toothed cylinder, taken in the line $y'y'$, Fig. 2; Fig. 4, a plan or top view of the same.

Similar letters of reference indicate corresponding parts in the several figures.

Hay-rakes drawn by horses have hitherto been so arranged as to render them both liable to catch obstructions and either break them in certain cases—as, for instance, where the rigid wooden teeth are employed—or straighten them out where the wire spring-teeth are used. The teeth also are liable to collect with the hay, sods, manure, &c., and also to scratch the ground and raise a dust which mixes with the hay and not only injures the appearance and sale of it, but is very injurious to cattle, especially to horses, causing the heaves, &c., also wearing their teeth. The ordinary hay-rakes also require considerable labor on the part of the attendant, and assistants are required to put the hay into proper windrows for cocking.

The object of the within-described invention is to obviate these difficulties, and to this end I employ a rotating cylinder provided with movable or adjustable teeth, and using in connection with the same elastic guides and an intermittingly-rotating crib-reel, as hereinafter fully shown and described.

To enable those skilled in the art to fully understand and construct my invention, I will proceed to describe it.

A represents a rectangular frame, which is mounted on two wheels, B B', and a caster-wheel, B'', and has thills C attached. D is a driver's seat on the front part of the frame, and E is a cylinder, which is suspended in the back part of the frame and allowed to rotate freely therein. The cylinder E is rotated from the wheel B' by a cross-belt, $a$, which passes around a pulley, $b$, on one end of the shaft of the cylinder E, the wheels B B' rotating in a reverse direction to cylinder E, as indicated by the arrows in Figs. 2 and 4.

The back part of the frame A is sustained by the caster-wheel B'', the shank or rod $b'$ of which passes up through the back cross-rail, $c$, of the frame A.

F is a bar which is placed underneath the cross-rail $c$, and has its inner end beveled, as shown at $d$ in Fig. 1, to form a wedge. This wedge-shaped end $d$ of the bar F is slotted longitudinally, and the shank or rod $b'$ passes through said slot so that the wedge may be interposed between the cross-rail $c$ and the fork $e$ of the shank or rod $b'$. The outer part of the bar F is slotted longitudinally and vertically, as shown at $f$ in Fig. 4, and a bolt, $g$, passes through said slot, said bolt sustaining the outer part of the bar F and the slot $f$, admitting of a longitudinal adjustment of the bar and a consequent raising or lowering of the back part of the frame A and the cylinder E, the wedge-shaped end $d$ effecting such result, as will be fully understood by referring to Fig. 1.

Within the cylinder E there are placed at equal distances apart a series of longitudinal rods, $h$, and on these rods teeth $i$ are placed loosely. These teeth $i$ may be of steel—at least that would be the preferable material—pointed at their outer ends and projecting through slots $j$ in the periphery of the cylinder E, the slots $j$ being sufficiently long to admit of a certain degree of play of the teeth in the slots. (See more particularly Fig. 2.) Through the inner parts of the teeth $i$ of each rod $h$ a rod, $k$, passes. These rods serve as weights to adjust by their gravity the teeth $i$, as will presently be shown.

The cylinder E is grooved circumferentially at equal distances apart, as shown at $l$ in Figs. 1 and 4, and into these grooves the upper ends of springs G fit. These springs may be simply metal rods of cylindrical form with their lower ends attached to the cross-rail $c$, as shown in Fig. 2.

To the back part of the frame A there are attached two inclined bars, $m\ m$, between the upper ends of which a shaft, $n$, is fitted and allowed to rotate freely. This shaft $n$ has rods $o$ passing through it at right angles to each other, and these rods form four compartments or cribs, $p\ p\ p\ p$, to receive the hay. These cribs are retained in position or prevented from casually turning by means of rods $q\ q$, one at each side of the machine, against which rods the outer ends of the rods $o$ of the cribs bear when the former are shoved backward to their fullest extent. The front ends of the rods $q\ q$ are attached to a swinging-bar, H, in the front part of the frame A, by actuating which the rods $q$ are adjusted.

The operation is as follows: As the machine is drawn along the cylinder E is rotated by the belt $a$ in the direction indicated by the arrow upon it, and the teeth $i$ as they ascend at the front side of the cylinder carry up the hay, the teeth, in consequence of the gravity of the rods $k$, being kept, as they ascend at the front side of the cylinder, in a hooked position—that is to say, with their outer ends elevated so as to obtain a proper hold to convey upward the hay. As the teeth $i$ reach the top of the cylinder they, in consequence of the gravity of the rods $k$, assume a vertical position, and as they descend at the back side of the cylinder their outer ends are elevated by the gravity of the rods $k$, so that the hay may be readily stripped from the teeth $i$ by the rods G, the latter serving as guides to conduct the hay into the cribs $p$. When a sufficient quantity of hay has passed into a crib the driver from his seat B actuates the bar H and draws forward the rods $q$, so that the shaft $n$ may rotate and an empty crib be brought in line with the guides G. As the teeth $i$ pass below the center of the cylinder E they again assume the hook position and operate as before. The teeth are made to operate as close to the ground as desirable by adjusting the bar F, as previously described.

Having thus described my invention, what I claim as new, and desire to secure by Letters Patent, is—

1. The revolving cylinder E, provided with the self-adjusting teeth $i$, arranged substantially as and for the purpose set forth.

2. The combination of the revolving toothed cylinder E, guides G, and intermittingly-rotating crib-reel formed of the shaft $n$ and rods $o$, as and for the purposes specified.

CYRUS J. FAY.

Witnesses:
 HORACE GRANT, Jr.,
 EDWD. T. MCKEAN.